United States Patent
Patel et al.

(10) Patent No.: US 10,760,793 B2
(45) Date of Patent: Sep. 1, 2020

(54) JET IN CROSS FLOW FUEL NOZZLE FOR A GAS TURBINE ENGINE

(71) Applicant: General Electric Company, Schenectady, NY (US)

(72) Inventors: Nayan Vinodbhai Patel, Liberty Township, OH (US); Alfred Albert Mancini, Cincinnati, OH (US); Duane Douglas Thomsen, Lebanon, OH (US); Michael Anthony Benjamin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 224 days.

(21) Appl. No.: 15/656,194

(22) Filed: Jul. 21, 2017

(65) Prior Publication Data
US 2019/0024899 A1    Jan. 24, 2019

(51) Int. Cl.
*F23R 3/28* (2006.01)
*F02C 7/22* (2006.01)
(Continued)

(52) U.S. Cl.
CPC ............. *F23R 3/286* (2013.01); *F02C 7/222* (2013.01); *F23D 11/107* (2013.01); *F23R 3/28* (2013.01);
(Continued)

(58) Field of Classification Search
CPC .................................. F23R 3/28; F23R 3/286
See application file for complete search history.

(56) References Cited

U.S. PATENT DOCUMENTS 3,638,865 A   2/1972   McEneny et al.
5,511,375 A   4/1996   Joshi et al.
(Continued)

FOREIGN PATENT DOCUMENTS

WO   WO2016/085494 A1   6/2016

OTHER PUBLICATIONS

Mansour, et al., A new hybrid air blast nozzle for advanced gas turbine combustors, 45th ASME Intentional Gas Turbine and Aeroengine Technical Congress and Exposition, ASME Turbo Expo '00, 2000-GT-0117, Munich Germany, May 8-11, 2000, pp. 1-9.
(Continued)

*Primary Examiner* — Jason H Duger
*Assistant Examiner* — Todd N Jordan
(74) *Attorney, Agent, or Firm* — Dority & Manning, P.A.

(57) ABSTRACT

The present disclosure is directed to a fuel nozzle assembly for a gas turbine engine. The fuel nozzle assembly includes a centerbody extended along a nozzle centerline axis and generally concentric thereto and an outer sleeve surrounding the centerbody and extended along the nozzle centerline axis and generally concentric thereto. The centerbody defines an outer wall extended at least partially along the nozzle centerline axis in which the centerbody defines a first fuel passage therewithin and one or more first fuel exit openings through the outer wall. Each first fuel exit opening is discrete from another along the outer wall. The outer sleeve and centerbody together define a first air passage therebetween. The first fuel passage and the first fuel exit opening are in fluid communication with the first air passage. The fuel nozzle assembly provides a first flow of fuel through the first fuel passage and first exit opening and a first flow of air through the first air passage, the first flow of fuel defines a jet in crossflow mixing with the first flow of air.

8 Claims, 4 Drawing Sheets

(51) Int. Cl.
F23R 3/34 (2006.01)
F23R 3/50 (2006.01)
F23D 11/10 (2006.01)
F02C 3/04 (2006.01)

(52) U.S. Cl.
CPC .............. F23R 3/346 (2013.01); F23R 3/50 (2013.01); *F02C 3/04* (2013.01); *F05D 2220/32* (2013.01); *F05D 2240/35* (2013.01); *F05D 2260/964* (2013.01); *F23R 2900/00013* (2013.01)

(56) References Cited

U.S. PATENT DOCUMENTS

| | | | |
|---|---|---|---|
| 6,389,815 B1 | 5/2002 | Hura et al. | |
| 6,543,235 B1 * | 4/2003 | Crocker | F23C 9/006 60/742 |
| 6,547,163 B1 * | 4/2003 | Mansour | B05B 1/3405 239/404 |
| 6,857,271 B2 | 2/2005 | Kraft et al. | |
| 7,266,945 B2 * | 9/2007 | Sanders | F23D 11/101 60/743 |
| 7,536,862 B2 | 5/2009 | Held et al. | |
| 7,878,000 B2 * | 2/2011 | Mancini | F23R 3/14 60/737 |
| 7,926,744 B2 * | 4/2011 | Thomson | F23R 3/28 239/405 |
| 8,136,359 B2 | 3/2012 | Stuttaford et al. | |
| 8,726,668 B2 | 5/2014 | Patel et al. | |
| 8,801,429 B2 * | 8/2014 | Eroglu | F23C 7/002 431/354 |
| 2008/0072605 A1 * | 3/2008 | Hagen | F23R 3/34 60/776 |
| 2011/0005229 A1 * | 1/2011 | Venkataraman | F23D 11/38 60/737 |
| 2013/0149100 A1 | 6/2013 | Lawlor et al. | |
| 2013/0199200 A1 | 8/2013 | Hoke et al. | |
| 2016/0186663 A1 | 6/2016 | Stewart et al. | |
| 2016/0230668 A1 * | 8/2016 | Yang | F02C 7/222 |
| 2017/0009995 A1 * | 1/2017 | Witham | F02C 3/00 |
| 2017/0108224 A1 * | 4/2017 | Beck | F23R 3/286 |
| 2018/0195726 A1 * | 7/2018 | Witham | F23R 3/38 |

OTHER PUBLICATIONS

Dai et al., On the flow structure of an inclined jet in crossflow at low velocity rations, ScienceDirect, International Journal of Heat and Fluid Flow, vol. 58, May 3, 2015, Refer to pp. 11-14. http://dx.doi.org/10.1016/j.ijheatfluidflow.2015.12.001 http://www.elsevier.com/locate/ijheatfluidflow.

Geankoplis, Transport Processes and Separation Process Principles (Includes Unit Operations), $4^{th}$ Edition, ISBN 978-0-13-101367-4, Pearson, 2003, Archived from original on May 1, 2015. Cited in Wikipedia Reference #2, (Website Link) https://en.wikipedia.org/wiki/Laminar_flow/#cite_note-3.

Prakash et al., Liquid jet in cross-flow-Effect of liquid entry conditions, Experimental Thermal and Fluid Science, ScienceDirect, vol. 93, May 2018, pp. 45-56. (Abstract Only) https://www.sciencedirect.com/science/article/pii/S0894177717303953.

Ruiz et al., Flow Topologies and Turbulence Scales in a Jet-In-Cross-Flow, SAND-2012-1530J, U.S. Department of Energy Office of Scientific and Technical Information osti.gov, Physics of Fluids, vol. 27, Issue 4, 2015, Refer to p. 3, Paragraph 2, 41 Pages. https://www.osti.gov/servlets/purl/1235319.

Noakes et al., Real Fluids, An Introduction to Fluid Mechanics, University of Leeds, Jan. 2009, Archived from Original Oct. 21, 2010, Retreived Nov. 23, 2010. (Website Link) Cited in Wikipedia Reference #3, https://en.wikipedia.org/wiki/Laminar_flow#cite_note-3.

United Kingdom Search and Examination Report Corresponding to GB Application No. GB1811512-1 dated Jan. 7, 2019.

* cited by examiner

JET IN CROSS FLOW FUEL NOZZLE FOR A GAS TURBINE ENGINE

FIELD

The present subject matter relates generally to gas turbine engine combustion assemblies for gas turbine engines.

BACKGROUND

Gas turbine engines experience combustion instability during operation at sub-idle conditions, steady state idle, and bursts or snap accelerations from idle. In various gas turbine engine apparatuses, operation at various idle and sub-idle conditions is necessary during transitions between steady state conditions, or during reduced power consumption periods (e.g., turn-down operation or part-load conditions for power generating gas turbine engines). However, combustion instability at or between these conditions generally results in excessive wear or deterioration of the combustion assembly and engine, or generally prevents operation of the gas turbine engine at the desired power output. Inability to operate the gas turbine engine at the desired power output (e.g., part-load) generally results in increased fuel consumption.

Known fuel nozzle assemblies address combustion stability issues via airblast atomizing fuel nozzles, including prefilming airblast atomizers. For example, known fuel nozzle assemblies include introducing a pressurized stream of liquid fuel from a fuel passage onto a solid wall surface (i.e., the prefilming surface). The liquid fuel egresses from a fuel passage as a film along the solid wall surface and is atomized at the edge of the wall by streams of air along the solid wall.

However, known fuel nozzle assemblies, such as those including prefilming airblast structures, may produce undesirable fuel/air re-circulation zones or flame stabilization. Furthermore, the high pressure of liquid fuel egressing the fuel passage may result in undesirable fuel filming on outer sleeve surfaces. Still further, prefilming airblast fuel nozzles including primary and secondary fuel injection may be insufficient to mitigate undesired mixing or collusion of the primary and secondary fuel/air streams.

As such, there is a need for a fuel nozzle structure that mitigates combustion instability, promotes stable part-load operation, and produces desired fuel/air mixing.

BRIEF DESCRIPTION

Aspects and advantages of the invention will be set forth in part in the following description, or may be obvious from the description, or may be learned through practice of the invention.

The present disclosure is directed to a fuel nozzle assembly for a gas turbine engine. The fuel nozzle assembly includes a centerbody extended along a nozzle centerline axis and generally concentric thereto and an outer sleeve surrounding the centerbody and extended along the nozzle centerline axis and generally concentric thereto. The centerbody defines an outer wall extended at least partially along the nozzle centerline axis in which the centerbody defines a first fuel passage therewithin and one or more first fuel exit openings through the outer wall. Each first fuel exit opening is discrete from another along the outer wall. The outer sleeve and centerbody together define a first air passage therebetween. The first fuel passage and the first fuel exit opening are in fluid communication with the first air passage. The fuel nozzle assembly provides a first flow of fuel through the first fuel passage and first exit opening and a first flow of air through the first air passage, the first flow of fuel defines a jet in crossflow mixing with the first flow of air.

In various embodiments, the outer wall of the centerbody defines an exit portion converging toward a downstream direction at an angle of approximately 20 degrees to approximately 60 degrees relative to the nozzle centerline axis. In one embodiment, the first fuel exit opening is defined within the exit portion of the outer wall of the centerbody. In another embodiment, the exit portion of the outer wall defines a length along the nozzle centerline axis from a downstream end of the centerbody equal to or less than approximately five times a maximum diameter of the first fuel exit opening. In yet other embodiments, the first fuel passage defines an outlet portion in fluid communication with the first fuel exit opening approximately perpendicular to the exit portion of the outer wall. In one embodiment, the outlet portion of the first fuel passage defines a length to the first fuel exit opening, and the length of the outlet portion is approximately 2.0 to approximately 3.5 times a maximum diameter of the first fuel exit opening.

In still various embodiments, the centerbody further defines a second fuel passage therewithin and a second fuel exit opening. The second fuel exit opening is centered at the nozzle centerline axis. In one embodiment, the fuel nozzle assembly provides a second flow of fuel through the second fuel passage and second exit opening.

In another embodiment of the fuel nozzle assembly, the outer sleeve defines a distance along a radial direction from the nozzle centerline axis fluidly segregated from the first flow of fuel from the first fuel exit opening.

In still another embodiment, a plurality of the first fuel exit openings is disposed in circumferential arrangement around the nozzle centerline axis on the outer wall of the centerbody.

The present disclosure is further directed to a gas turbine engine including a plurality of fuel nozzle assemblies disposed in circumferential arrangement around a longitudinal centerline of the gas turbine engine. Each fuel nozzle assembly includes a centerbody and an outer sleeve each extended along a nozzle centerline axis and generally concentric thereto. The centerbody defines an outer wall extended at least partially along the nozzle centerline axis. The centerbody defines a first fuel passage therewithin and one or more first fuel exit openings through the outer wall. Each first fuel exit opening is discrete from another along the outer wall. The outer sleeve and centerbody together define a first air passage therebetween. The first fuel passage and the first fuel exit opening is in fluid communication with the first air passage. The fuel nozzle assembly provides a first flow of fuel through the first fuel passage and first exit opening and a first flow of air through the first air passage. The first flow of fuel defines a jet in crossflow mixing with the first flow of air.

In various embodiments, the gas turbine engine defines a first fuel nozzle and a second fuel nozzle among the plurality of fuel nozzles. The first fuel nozzle defines a first diameter of the first fuel passage and the first fuel exit opening and the second fuel nozzle defines a second diameter of the first fuel passage and the first fuel exit opening. In one embodiment, the first fuel nozzle defines a first flow rate of fuel through the first fuel passage and first exit orifice, and wherein the second fuel nozzle defines a second flow rate of fuel through the first fuel passage and the first exit orifice, the first flow rate and the second flow rate providing attenuation of combustion acoustics.

In other embodiments of the gas turbine engine, the outer wall of the centerbody defines an exit portion converging toward a downstream direction at an angle of approximately 20 degrees to approximately 60 degrees relative to the nozzle centerline axis. In one embodiment, the gas turbine engine defines a first fuel nozzle and a second fuel nozzle among the plurality of fuel nozzles. The first fuel nozzle defines a first angle of the exit portion of the centerbody different from a second angle of the exit portion at the second fuel nozzle. In another embodiment, the first fuel exit opening is defined within the exit portion of the outer wall of the centerbody. In still another embodiment, the exit portion of the outer wall defines a length along the nozzle centerline axis from a downstream end of the centerbody equal to or less than approximately five times a maximum diameter of the first fuel exit opening. In yet other embodiments, the first fuel passage defines an outlet portion in fluid communication with the first fuel exit opening approximately perpendicular to the exit portion of the outer wall. In one embodiment, the outlet portion of the first fuel passage defines a length to the first fuel exit opening, and wherein the length of the outlet portion is approximately 2.0 to approximately 3.5 times a maximum diameter of the first fuel exit opening.

In another embodiment of the gas turbine engine, the outer sleeve defines a distance along a radial direction from the nozzle centerline axis fluidly segregated from the first flow of fuel from the first fuel exit opening.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
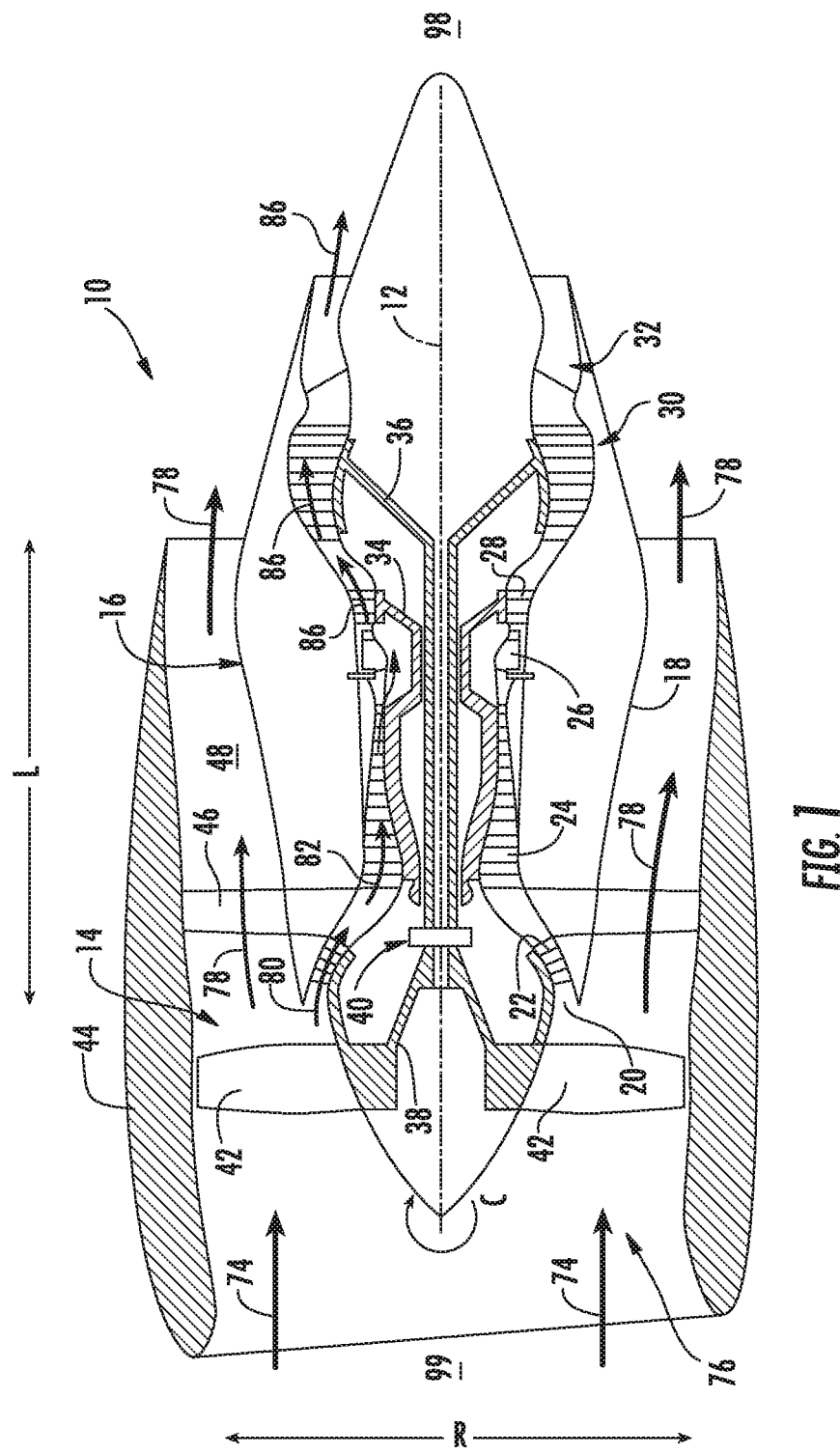
FIG. 1 is a schematic cross sectional view of an exemplary gas turbine engine incorporating an exemplary embodiment of a fuel injector and fuel nozzle assembly.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a fuel nozzle assembly that may mitigate combustion instability, promote stable part-load operation, and produce desired fuel/air mixing are generally provided. The embodiments of the fuel nozzle assembly provided herein may improve fuel atomization by reducing or eliminating interaction of fuel flows of pilot primary and secondary flows at the combustion chamber. The fuel nozzle assembly may further mitigate undesired combustion dynamics through thermal asymmetry, such as through varied circumferential geometry or independent fuel flow feeds through the plurality of fuel nozzle assemblies.

Referring now to the drawings, FIG. 1 is a schematic partially cross-sectioned side view of an exemplary high bypass turbofan engine 10 herein referred to as "engine 10" as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, the engine 10 has an axial or longitudinal centerline axis 12 that extends there through for reference purposes. The engine 10 defines a longitudinal direction L and an upstream end 99 and a downstream end 98 along the longitudinal direction L. The upstream end 99 generally corresponds to an end of the engine 10 along the longitudinal direction L from which air enters the engine 10 and the downstream end 98 generally corresponds to an end at which air exits the engine 10, generally opposite of the upstream end 99 along the longitudinal direction L. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure compressor and turbine rotatable with an intermediate pressure shaft altogether defining a three-spool gas turbine engine.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Figure 2:
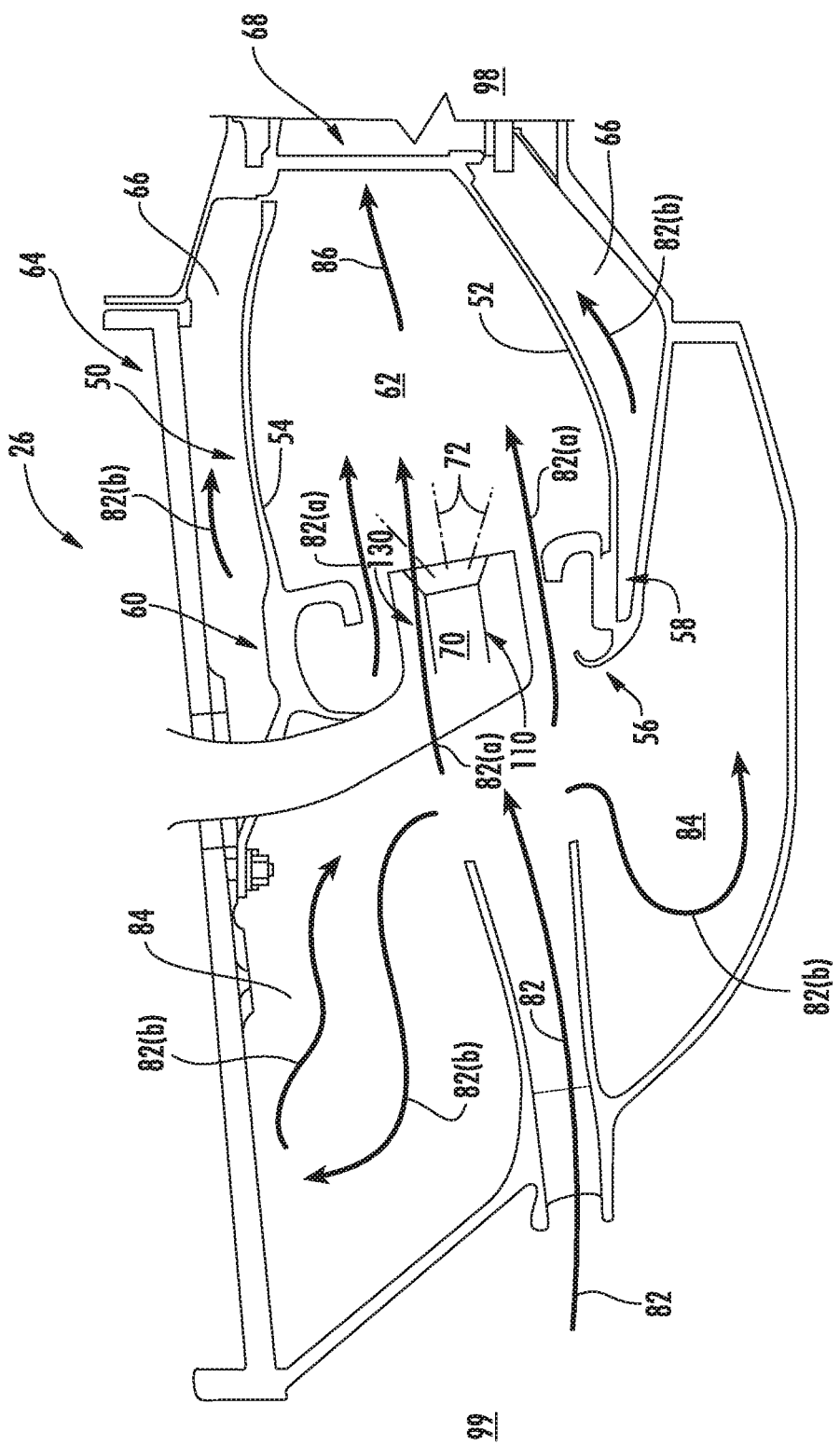
FIG. 2 is an axial cross sectional view of an exemplary embodiment of a combustor assembly of the exemplary engine shown in FIG. 1.

FIG. 2 is a cross sectional side view of an exemplary combustion section 26 of the core engine 16 as shown in FIG. 1. As shown in FIG. 2, the combustion section 26 may generally include an annular type combustor 50 having an annular inner liner 52, an annular outer liner 54 and a bulkhead 56 that extends radially between upstream ends 58, 60 of the inner liner 52 and the outer liner 54 respectively. In other embodiments of the combustion section 26, the combustion assembly 50 may be a can-annular type. The combustor 50 further includes a dome assembly 57 extended radially between the inner liner 52 and the outer liner 54 downstream of the bulkhead 56. As shown in FIG. 2, the inner liner 52 is radially spaced from the outer liner 54 with respect to engine longitudinal centerline 12 (FIG. 1) and defines a generally annular combustion chamber 62 therebetween. In particular embodiments, the inner liner 52, the outer liner 54, and/or the dome assembly 57 may be at least partially or entirely formed from metal alloys or ceramic matrix composite (CMC) materials.

As shown in FIG. 2, the inner liner 52 and the outer liner 54 may be encased within an outer casing 64. An outer flow passage 66 of a diffuser cavity or pressure plenum 84 may be defined around the inner liner 52 and/or the outer liner 54. The inner liner 52 and the outer liner 54 may extend from the bulkhead 56 towards a turbine nozzle or inlet 68 to the HP turbine 28 (FIG. 1), thus at least partially defining a hot gas path between the combustor assembly 50 and the HP turbine 28. A fuel nozzle assembly 70 may extend at least partially through the bulkhead 56 to provide a fuel-air mixture 72 to the combustion chamber 62. In various embodiments, the bulkhead 56 includes a fuel-air mixing structure attached thereto (e.g., a swirler assembly).

During operation of the engine 10, as shown in FIGS. 1 and 2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows into a diffuser cavity or pressure plenum 84 of the combustion section 26. The pressure plenum 84 generally surrounds the inner liner 52 and the outer liner 54, and generally upstream of the combustion chamber 62.

The compressed air 82 pressurizes the pressure plenum 84. A first portion of the of the compressed air 82, as indicated schematically by arrows 82(*a*) flows from the pressure plenum 84 into the combustion chamber 62 through the fuel nozzle 70 (e.g., across a vane structure 131 shown in FIG. 3 configured to promote fuel-air mixing) where it is mixed with the fuel 72 and burned, thus generating combustion gases, as indicated schematically by arrows 86, within the combustor 50. Typically, the LP and HP compressors 22, 24 provide more compressed air to the pressure plenum 84 than is needed for combustion. Therefore, a second portion of the compressed air 82 as indicated schematically by arrows 82(*b*) may be used for various purposes other than combustion. For example, as shown in FIG. 2, compressed air 82(*b*) may be routed into the outer flow passage 66 to provide cooling to the inner and outer liners 52, 54.

Referring back to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

Figure 3:
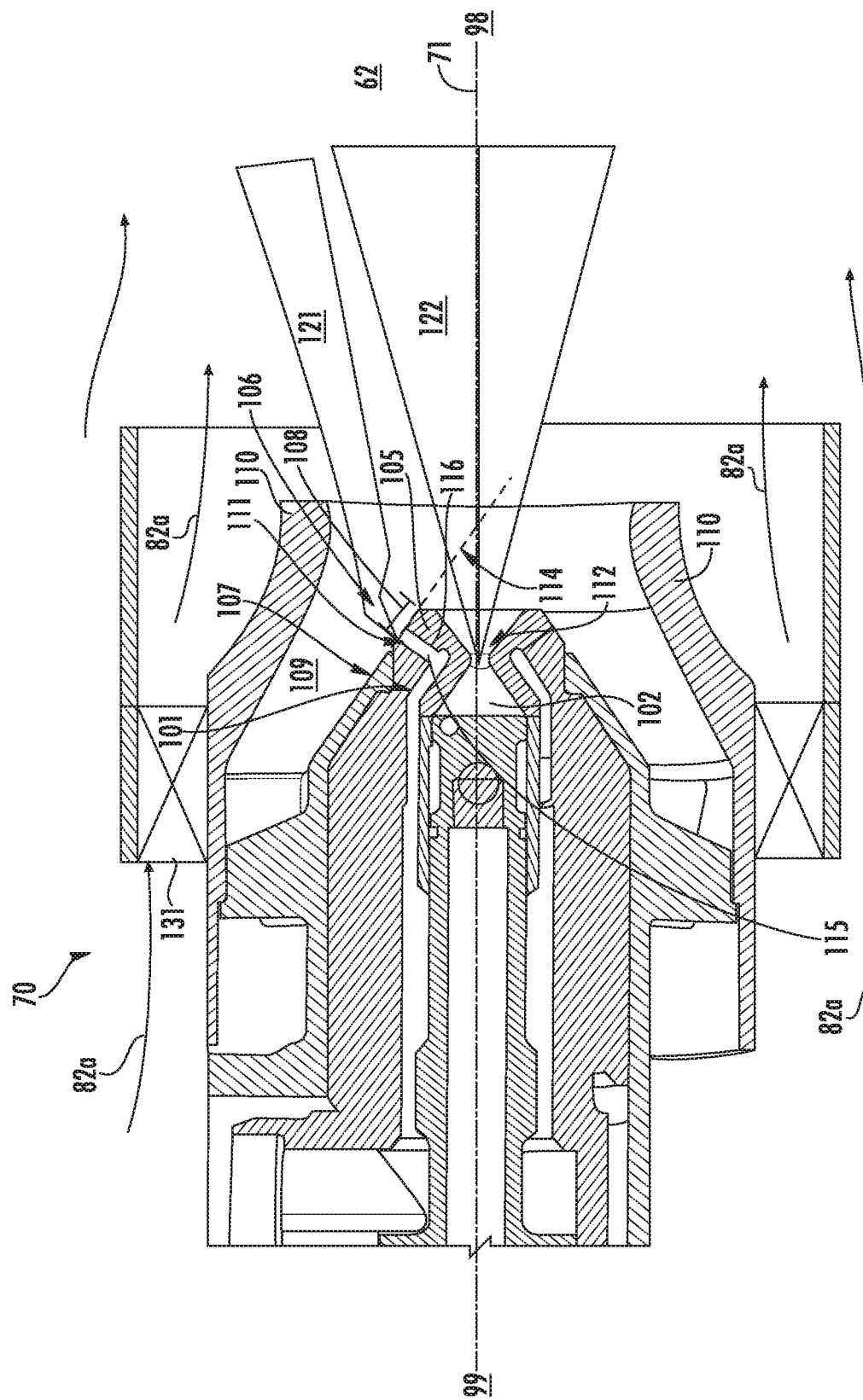
FIG. 3 is an axial cross sectional view of an exemplary embodiment of a fuel nozzle assembly of the exemplary engine shown in FIG. 1.

Referring now to FIG. 3, a cross sectional view of an exemplary embodiment of the fuel nozzle assembly 70 is generally provided. The engine 10 includes a plurality of fuel nozzle assemblies 70 disposed in circumferential arrangement around the longitudinal centerline 12 of the gas turbine engine 10. Each fuel nozzle assembly 70 defines a nozzle centerline axis 71 extended therethrough for reference purposes. The nozzle centerline axis 71 is generally disposed along a direction of flow of air through the engine 10, such as along the longitudinal direction L from the upstream end 99 to the downstream end 98. However, the nozzle centerline axis 71 may be disposed co-linearly to the longitudinal centerline 12 or at an angle.

Each fuel nozzle assembly 70 includes a centerbody 105 extended along the nozzle centerline axis 71. The centerbody 105 is defined generally concentric to the nozzle centerline axis 71. The centerbody 105 defines an outer wall 107 extended at least partially along the direction at which nozzle centerline axis 71 extends. The centerbody 105 further defines a first fuel passage 101 within the centerbody 105. One or more discrete first fuel exit openings 111 are defined through the outer wall 107.

Figure 4:
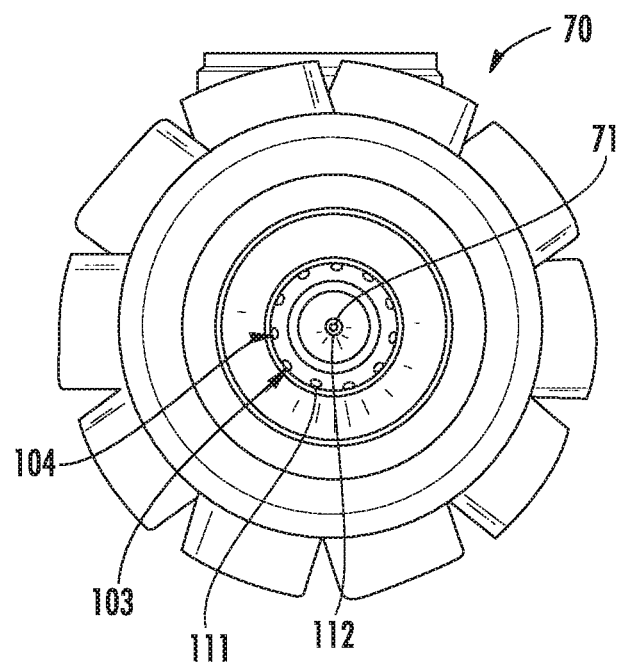
FIG. 4 is a downstream looking upstream view of an exemplary embodiment of the fuel nozzle assembly shown in FIG. 3.

For example, referring briefly to the downstream looking upstream view of the fuel nozzle assembly 70 depicted in FIG. 4, each first fuel exit opening 111 is defined as separate openings fluidly segregated from one another through the outer wall 107 of the centerbody 105. In various embodiments, the fuel nozzle assembly 70 defines two or more first fuel exit openings 111 in circumferential arrangement around the nozzle centerline axis 71. In one embodiment, such as generally depicted in FIG. 4, the plurality of first fuel exit openings 111 are arranged in symmetric circumferential arrangement around the nozzle centerline axis 71. In another embodiment, the plurality of first fuel exit openings 111 are arranged in asymmetric circumferential arrangement around the nozzle centerline axis 71.

Figure 5:
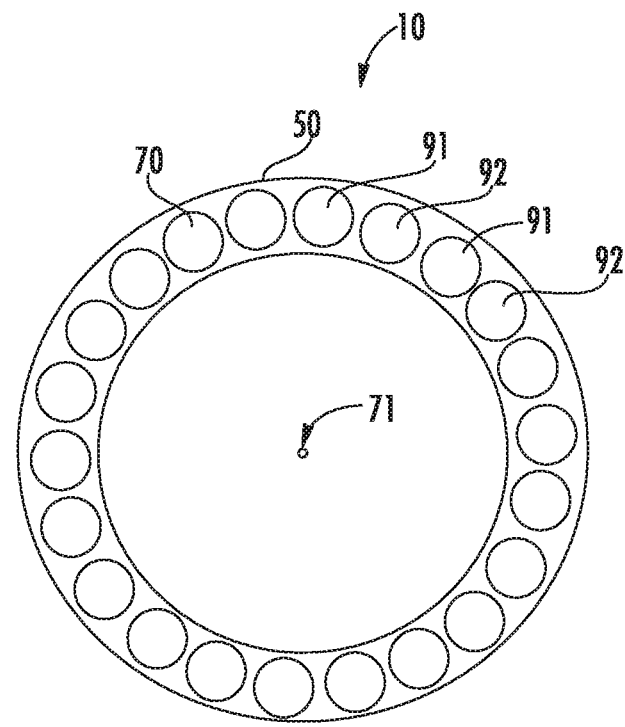
FIG. 5 is a downstream looking upstream view of an exemplary embodiment of a combustor assembly including an exemplary embodiment of a plurality of the fuel nozzle assembly shown in FIGS. 1-4.

Referring now to the downstream looking upstream view of the engine 10 depicted in FIG. 5, among various embodiments of the plurality of fuel nozzle assemblies 70 defined around the longitudinal centerline 12 of the engine 10, the engine 10 may define a first fuel nozzle 91 and a second fuel nozzle 92. The first fuel nozzle 91 defines a first diameter 103 of the first fuel passage 101 and the first fuel exit opening 111. The second fuel nozzle 92 defines a second diameter 104 of the first fuel passage 101 and the first fuel exit opening 111 of the second fuel nozzle 92.

The first diameter 103 at the first fuel nozzle 91 enables the plurality of fuel nozzles 70 to provide a first flow rate of fuel through the first fuel passage 101 and first exit orifice 111 different from a second flow rate of fuel through the first fuel passage 101 and the first exit orifice 111 of the second fuel nozzle assembly 70. Providing the first flow rate and the second flow rate enables attenuation of undesired combustion acoustics (e.g., noise, vibrations, or harmonics due to pressure oscillations resulting from unsteady energy release during combustion of the fuel/air mixture in the combustion chamber 62).

Referring back to FIG. 3, the fuel nozzle assembly 70 further includes an outer sleeve 110 surrounding the centerbody 105. The outer sleeve 110 is extended along the nozzle centerline axis 71. The outer sleeve 110 is generally concentric to the nozzle centerline axis 71. The outer sleeve 110 and centerbody 105 together define a first air passage 109 therebetween. The first air passage 109 is extended at least partially along the direction of the nozzle centerline axis 71. The first fuel passage 101 and the first fuel exit opening 111 are together in fluid communication with the first air passage 109.

During operation of the engine 10, the fuel nozzle assembly 70 provides a first flow of fuel through the first fuel passage 101 and first fuel exit opening 111. The fuel nozzle assembly 70 further provides a first flow of air through the first air passage 109. The first flow of fuel defines a jet-in-crossflow (JICF) mixing with the first flow of air. For example, the first flow of fuel egresses from the discrete openings of the first exit opening 111 and interacts with the first flow of air passing through the first air passage 109. The JICF mixing of fuel from each first fuel exit opening 111 into the first air passage 109 mitigates interaction of a first fuel/air mixture 121 and a second fuel/air mixture 122 from a second fuel passage 102 extended within the centerbody 105 and a second fuel exit opening 112. Mitigating interaction of the first fuel/air mixture 121 and the second fuel/air mixture 122 may improve fuel atomization (e.g., in contrast to airblast atomizers) while further mitigating inter-mixing or interaction of the fuel/air mixtures 121, 122.

Referring still to FIG. 3, the second fuel exit opening 112 is centered at the nozzle centerline axis 71. The fuel nozzle assembly 70 generally provides a conical flow of the second flow of fuel egressing from the second fuel exit opening 112. The first fuel exit openings 111, in conjunction with the first flow of air through the first air passage 109, provides the first fuel/air mixture 121 generally around and fluidly segregated from the second fuel flow egressing the second fuel exit opening 112, thereby improving fuel/air mixing and combustion efficiency and performance.

In various embodiments, the outer wall 107 of the centerbody 105 of the fuel nozzle assembly 70 defines an exit portion 106 converging toward a downstream direction (i.e., toward the downstream end 98) at an angle 114 relative to the nozzle centerline axis 71. The angle 114 is defined approximately 20 degrees to approximately 60 degrees relative to the nozzle centerline axis 71. In one embodiment, the angle 114 is nominally approximately 45 degrees. Referring to FIGS. 3 and 5, in various embodiments, the plurality of fuel nozzle assemblies 70 defines a plurality of angles 114 at each fuel nozzle assembly 70. For example, the first fuel nozzle 91 defines a first angle 114 of the exit portion 106 of the centerbody 105 different from a second angle 114 of the exit portion 106 at the second fuel nozzle 92.

In another embodiment, the first fuel passage 101 defines an outlet portion 115 in fluid communication with the first fuel exit opening 111. The outlet portion 115 of the first fuel passage 101 is defined approximately perpendicular to the exit portion 106 of the outer wall 107. For example, the outlet portion 115 extends generally toward the downstream direction. In one embodiment, the outlet portion 115 of the first fuel passage 101 defines a length 116 to the first fuel exit opening 111. The length 116 of the outlet portion 115 is approximately 1.5 to approximately 4.0 times a maximum diameter 103, 104 of the first fuel exit opening 111. In another embodiment, the length 116 is approximately 2.0 to approximately 3.5 times a maximum diameter 103, 104 of the first fuel exit opening 111.

Referring still to FIG. 3, in various embodiments, the first fuel exit opening 111 is defined within the exit portion 106 of the outer wall 107 of the centerbody 105. In one embodiment, the exit portion 106 of the outer wall 107 defines a length 108 along the nozzle centerline axis 71 from a downstream end of the centerbody 105 equal to or less than approximately five times a maximum diameter 103, 104 of the first fuel exit opening 111.

The centerbody 105 and outer sleeve 110 together define a pilot nozzle assembly of the fuel nozzle assembly 70. In various embodiments, the second fuel passage 102 through the centerbody 105 flowing the second flow of fuel defines a primary pilot nozzle feed into the combustion chamber 62. For example, the second fuel passage 102 provides the second flow of fuel at flows, pressures, etc. to enable ignition of the engine 10. In other embodiments, the first fuel passage 101 and first fuel exit openings 111 providing a jet of first flow of fuel in crossflow with a first flow of air through the first air passage 109 defines a secondary pilot nozzle feed into the combustion chamber 62. For example, the first fuel passage 101 provides the first flow of fuel at flows, pressures, etc. following ignition to enable higher power operating conditions. The fuel nozzle assembly 70 defining a primary and secondary flow pilot nozzle enables introduction of thermal asymmetry to mitigate combustion dynamics. The fuel nozzle assembly 70 may further provide independently controllable first and second fuel flows, thereby enabling stable combustion at part-load steady state conditions, including sub-idle and idle conditions, or transient bursts (e.g., sudden or snap accelerations or decelerations) from sub-idle and idle conditions to higher power conditions.

All or part of the combustor assembly 50, including the fuel nozzle assembly 70, may be part of a single, unitary component and may be manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or any combination thereof may be utilized to construct the combustor 50, including, but not limited to the embodiments of the fuel nozzle assembly 70 as generally described herein. Furthermore, the combustor assembly may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include high-strength steels, nickel and cobalt-based alloys, and/or metal or ceramic matrix composites, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A jet in crossflow fuel nozzle assembly for a gas turbine engine, the fuel nozzle assembly comprising:
 a centerbody extended along a nozzle centerline axis, the centerbody defining an outer wall extended at least partially along the nozzle centerline axis, wherein the centerbody defines a first fuel passage therewithin and one or more fuel exit openings through an exit portion of the outer wall of the centerbody, wherein each fuel exit opening of the one or more fuel exit openings is discrete from another along the outer wall, wherein the outer wall of the centerbody is converging from upstream of the one or more fuel exit openings toward a downstream direction through the exit portion at an angle of 20 degrees to 60 degrees relative to the nozzle centerline axis, wherein a first fuel exit opening of the one or more fuel exit openings is defined within the exit portion of the outer wall of the centerbody, wherein the exit portion of the outer wall is extended upstream from a downstream end of the centerbody equal to or less than five times a maximum diameter of the first fuel exit opening, wherein the first fuel passage defines an outlet portion in fluid communication with the first fuel exit opening perpendicular to the exit portion of the outer wall, wherein the outlet portion of the first fuel passage defines a length to the first fuel exit opening, wherein the length of the outlet portion is between 2.0 to 3.5 times the maximum diameter of the first fuel exit opening, and wherein the outer wall of the centerbody is extended upstream and downstream of the one or more fuel exit openings; and
 an outer sleeve surrounding the centerbody and extended along the nozzle centerline axis, the outer sleeve and the centerbody together defining a first air passage therebetween, and wherein the first fuel passage and the one or more fuel exit openings is in fluid communication with the first air passage, and wherein the jet in crossflow fuel nozzle assembly provides a first flow of fuel through the first fuel passage and the first fuel exit opening and a first flow of air through the first air passage, and wherein the outer sleeve is positioned from the nozzle centerline axis fluidly segregated from the first flow of fuel from the first fuel exit opening.

2. The fuel nozzle assembly of claim 1, wherein the centerbody further defines a second fuel passage therewithin and a second fuel exit opening, wherein the second fuel exit opening is centered at the nozzle centerline axis.

3. The fuel nozzle assembly of claim 2, wherein the fuel nozzle assembly provides a second flow of fuel through the second fuel passage and second fuel exit opening.

4. The fuel nozzle assembly of claim 1, wherein a plurality of the one or more fuel exit openings is disposed in circumferential arrangement around the nozzle centerline axis on the outer wall of the centerbody.

5. A gas turbine engine, the gas turbine engine comprising:
 a plurality of jet in cross flow fuel nozzle assemblies disposed in circumferential arrangement around a longitudinal centerline of the gas turbine engine, wherein each jet in cross flow fuel nozzle assembly comprises:
 a centerbody extended along a nozzle centerline axis, the centerbody defining an outer wall extended at least partially along the nozzle centerline axis, wherein the centerbody defines a first fuel passage therewithin and one or more fuel exit openings through an exit portion of the outer wall of the centerbody, wherein each fuel exit opening of the one or more fuel exit openings is discrete from another along the outer wall, wherein the outer wall of the centerbody is converging from upstream of the one or more fuel exit openings toward a downstream direction through the exit portion at an angle of 20 degrees to 60 degrees relative to the nozzle centerline axis, wherein a first fuel exit opening of the one or more fuel exit openings is defined within the exit portion of the outer wall of the centerbody, wherein the exit portion of the outer wall is extended upstream from a downstream end of the centerbody equal to or less than five times a maximum diameter of the first fuel exit opening, wherein the first fuel passage defines an outlet portion in fluid communication with the first fuel exit opening perpendicular to the exit portion of the outer wall, wherein the outlet portion of the first fuel passage defines a length to the first fuel exit opening, wherein the length of the outlet portion is between 2.0 to 3.5 times the maximum diameter of the first fuel exit opening, and wherein the outer wall of the centerbody is extended upstream and downstream of the one or more fuel exit openings; and
 an outer sleeve surrounding the centerbody and extended along the nozzle centerline axis, the outer sleeve and the centerbody together defining a first air passage therebetween, and wherein the first fuel passage and the one or more fuel exit openings is in fluid communication with the first air passage, and wherein the jet in crossflow fuel nozzle assembly provides a first flow of fuel through the first fuel passage and the first fuel exit opening and a first flow of air through the first air passage, and wherein the outer sleeve is positioned from the nozzle centerline axis fluidly segregated from the first flow of fuel from the first fuel exit opening.

6. The gas turbine engine of claim 5, wherein the gas turbine engine defines a first fuel nozzle and a second fuel nozzle among the plurality of jet in cross flow fuel nozzle assemblies, wherein the first fuel nozzle defines a first diameter of the respective first fuel passage and the respective first fuel exit opening and the second fuel nozzle defines a second diameter of the respective first fuel passage and the respective first fuel exit opening.

7. The gas turbine engine of claim 6, wherein the first fuel nozzle defines a first flow rate of fuel through the respective first fuel passage and the respective first exit orifice, and wherein the second fuel nozzle defines a second flow rate of fuel through the respective first fuel passage and the respective first exit orifice, the first flow rate and the second flow rate providing attenuation of combustion acoustics.

8. The gas turbine engine of claim 5, wherein the plurality of jet in crossflow fuel nozzle assemblies comprises a first fuel nozzle and a second fuel nozzle, wherein the first fuel nozzle defines a first angle of a respective exit portion of a respective centerbody different from a second angle of a respective exit portion of the respective second fuel nozzle.

\* \* \* \* \*